US012550831B2

(12) United States Patent
Van Heijningen et al.

(10) Patent No.: US 12,550,831 B2
(45) Date of Patent: Feb. 17, 2026

(54) GREENHOUSE COMPRISING A CLIMATE CONTROL SYSTEM

(71) Applicant: ALCOMIJ BEHEER B.V., 's-Gravenzande (NL)

(72) Inventors: Sven Peter Van Heijningen, Wateringen (NL); Willem Nowé, Maassluis (NL)

(73) Assignee: ALCOMIJ BEHEER B.V., 's-Gravenzande (NL)

( * ) Notice: Subject to any disclaimer, the term of this patent is extended or adjusted under 35 U.S.C. 154(b) by 82 days.

(21) Appl. No.: 18/246,356

(22) PCT Filed: Sep. 23, 2021

(86) PCT No.: PCT/EP2021/076163
§ 371 (c)(1),
(2) Date: Mar. 23, 2023

(87) PCT Pub. No.: WO2022/063875
PCT Pub. Date: Mar. 31, 2022

(65) Prior Publication Data
US 2023/0389484 A1    Dec. 7, 2023

(30) Foreign Application Priority Data

Sep. 24, 2020 (NL) .................................. 1043795
Oct. 8, 2020 (NL) .................................. 1043812

(51) Int. Cl.
*A01G 9/24* (2006.01)
*A01G 9/14* (2006.01)
(Continued)

(52) U.S. Cl.
CPC .............. *A01G 9/14* (2013.01); *A01G 9/246* (2013.01); *F24F 7/007* (2013.01); *F24F 11/74* (2018.01);
(Continued)

(58) Field of Classification Search
CPC ............. A01G 9/24; A01G 9/246; A01G 9/14
See application file for complete search history.

(56) References Cited

U.S. PATENT DOCUMENTS 4,742,475 A      5/1988  Kaiser et al.
2005/0005528 A1*  1/2005  Brault .................... A01G 9/246
                                                    52/63
(Continued)

FOREIGN PATENT DOCUMENTS

CN      111567275 A     8/2020
DE    202016105400 U1   10/2016
(Continued)

OTHER PUBLICATIONS

International Search Report and Written Opinion for PCT/EP2021/076163; Dec. 23, 2021; 17 pgs.

*Primary Examiner* — Kristen C Hayes
(74) *Attorney, Agent, or Firm* — Perilla Knox & Hildebrandt LLP

(57) ABSTRACT

It is disclosed a ventilator (9A, 9) comprises a housing (20) having opposite first (21) and second ends (22) and an axial rotor (23) arranged in a ventilator flow path (23A), wherein the ventilator flow path (23A) has an inlet at the first end (21) of the housing (20) and an outlet (22A) at the second end of the housing (20) and wherein an additional flow path (25) is present comprising one or more sensors and which additional flow path (25) fluidly connects an opening (16, 24) in the housing (20) with the ventilator flow path (23A) for drawing in air due to a venturi effect via the additional flow path (25) towards the ventilator flow path (23A), wherein the sensors are temperature and/or humidity sensors.

11 Claims, 7 Drawing Sheets

(51) Int. Cl.
      *F24F 7/007*       (2006.01)
      *F24F 11/74*       (2018.01)
      *F24F 13/02*       (2006.01)
      *F24F 110/10*      (2018.01)
      *F24F 110/20*      (2018.01)

(52) U.S. Cl.
      CPC ....... F24F 13/0227 (2013.01); *F24F 2110/10* (2018.01); *F24F 2110/20* (2018.01)

(56)             References Cited

U.S. PATENT DOCUMENTS

2006/0059772 A1*   3/2006   Brault .................... A01G 9/246
                                                          47/17
2023/0097951 A1*   3/2023   Huh ........................ A01G 9/14
                                                           47/17

FOREIGN PATENT DOCUMENTS

| DE | 102016002997 A1 * | 9/2017 |
|---|---|---|
| NL | 1043187 A | 9/2019 |
| WO | 2019125169 A1 | 6/2019 |
| WO | 2019216768 A1 | 11/2019 |

* cited by examiner

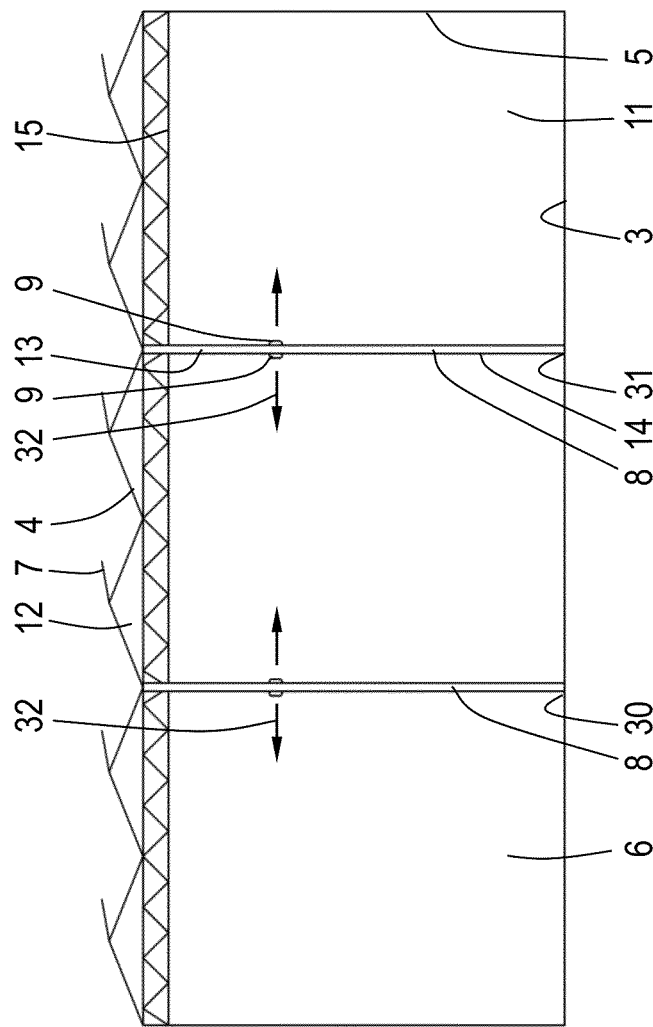
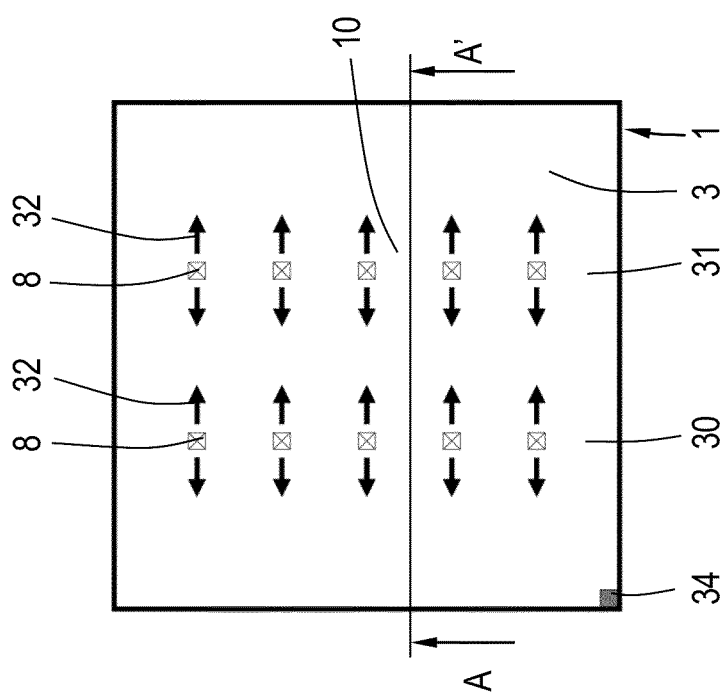
Fig. 7
Fig. 6

GREENHOUSE COMPRISING A CLIMATE CONTROL SYSTEM

The invention is directed to a greenhouse comprising a climate control system and a roof, walls and a floor defining an interior greenhouse space, said greenhouse space comprising an upper space and a lower space as present below the upper space. The roof is provided with closable openings. The climate control system comprises a number of control units comprising an air displacement ventilator for transporting air from the upper space to the lower space.

Such a greenhouse is described in WO2019/216768. This publication describes a greenhouse having a roof which is supported by trusses. The trusses are supported by columns which extend downwards to a floor of the greenhouse. At the elevation of the trusses a removable horizontal screen is present. The screen divides the interior of the greenhouse in an upper space and a lower space. Ventilators are connected to the trusses and may be provided with an air inlet to draw in air from the upper space and an air inlet to draw air from the lower space. The air from the upper space and lower space may be blended and discharged into the lower space. According to this publication the ventilators are operated as a group resulting in evenly conditions.

The present invention provides a ventilator which can be advantageously used in a greenhouse for controlling the climate.

The invention is directed to such a ventilator comprises a housing having opposite first and second ends and an axial rotor arranged in a ventilator flow path, wherein the ventilator flow path has an inlet at the first end of the housing and an outlet at the second end of the housing and wherein an additional flow path is present comprising one or more sensors and which additional flow path fluidly connects an opening in the housing with the ventilator flow path for drawing in air due to a venturi effect via the additional flow path towards the ventilator flow path. The sensors are preferably temperature and/or humidity sensors.

The invention is also directed to a greenhouse preferably comprising the ventilator according to the invention. A disadvantage is that with the prior art greenhouse large variation in temperature and/or humidity conditions in the greenhouse is observed during daytime. The object of the present invention is to provide a greenhouse not having such a disadvantage.

This is achieved with the following greenhouse. Greenhouse comprising a climate control system and a roof, walls and a floor defining an interior greenhouse space, said greenhouse space comprising an upper space and a lower space as present below the upper space,
wherein the roof is provided with closable openings,
wherein the climate control system comprises a grid of control units and a central controller,
wherein a control unit comprises an air flow path from the upper space to the lower space, an in air displacement controllable ventilator preferably according to this invention for displacement of air from the upper space to the lower space via the air flow path and a temperature sensor and/or a humidity sensor suited to provide a measured temperature value and/or a measured humidity value, and
wherein the central controller is programmed to individually adapt the air displacement of the ventilator of each control unit based on the measured temperature values and/or measured humidity values.

Applicants found that the temperature differences or humidity differences in the greenhouse can be minimised by the grid of control units. By measuring the local conditions and adapting the local air flow from the upper space to the lower space depending on the measured local conditions it is possible to create a more uniform climate in the interior greenhouse space. Further advantages shall be described when discussing the preferred embodiments of this invention.

Terms as upper, lower, above and below are used to describe the greenhouse and the method to control the climate in a greenhouse for a greenhouse in its most common orientation.

The greenhouse having a roof, walls and a floor which define an interior greenhouse space is preferably a typical greenhouse wherein the roof is a saddle roof or an arched roof having two gable end walls and two side walls. The walls may comprise glass panels or plastic foils. The saddle roof or arched roof is suitably supported by a framework, also referred to as trusses. The trusses are supported by columns. Such columns are upright, preferably vertical columns. Preferably one or more removable screens are present between the trusses. These screens separate an upper space according to this invention as present between the screens and the roof from a lower space according to this invention as present between the screen and the floor. A screen is well known in the art and serves to control the climate in the interior of the greenhouse. The screen may for example be closed during the night if it is desired to reduce the loss of heat from the greenhouse. The screen may be closed during the day to protect the cultivation from excessive heat.

The roof is provided with closable openings suited for ambient air to enter the interior of the greenhouse and/or for air being discharged from the interior of the greenhouse. The closable openings may be traditional windows or for example openings in the ridge beam as described in WO2019/125169.

The central controller is suitably programmed to individually adapt the air displacement of the ventilator of a single control unit using the temperature value and/or humidity value as measured by the control unit and the one or more temperature values and/or one or more humidity values as measured by one or more other control units of the grid. In use it is preferred that the air displacement means of all the control units of the grid are continuously displacing air either from the upper space to the lower space and/or from a lower region of the lower space to a higher region of the lower space.

The difference in how the air displacement of the ventilator of a single control unit are adapted results in that the climate conditions in the interior of the greenhouse are homogenised. The adaption of the air displacement of the ventilator of a single control unit is performed by the control unit. This unit may be programmed in different ways. The central controller is programmed to adapt the air displacement of the ventilator of a single control unit based on the measured temperature and/or the measured humidity values. In such a programmed logic the local measured temperature may for example be compared to an average temperature of all temperature measurements of all control units in the grid and wherein the air displacement of a single control unit is increased or decreased depending if the temperature is higher respectively lower than the calculated average value. As an alternative the average value as measured by a number of control units in the vicinity of the control unit to be controlled may be used. For example an average value of 5-10 units in the vicinity of the control unit may be used. For example the central controller may be programmed to individually increase the air displacement of the ventilator of a single control unit when the temperature value as measured by the control unit is higher than a calculated value based on the temperature values as measured by the other control units of the grid. This calculated value may be for example the average value, the lowest value, the average of the 10 lowest values or the median value. In this calculation other parameters may be incorporated like for example the fact that the control is performed during the night or day time.

The measured humidity value may be used in the same fashion as the measured temperature value, wherein the air displacement is increased of a single control unit when the measured humidity value is higher than an average value. Suitably the central controller is programmed to individually increase the air displacement of the ventilator of a single control unit when the humidity value as measured by the control unit is higher than a calculated value based on the humidity values as measured by the other control units of the grid.

When all control units are simultaneously and continuously or regularly controlled in this manner it is found that the temperature differences in the interior of the greenhouse are smaller as compared to when such an individual control is not applied.

Preferably the control unit has both a temperature sensor and a humidity sensor. The central controller is programmed to individually adapt the air displacement of the ventilator of a single control unit when the measured temperature value and/or measured humidity value as measured by the temperature and humidity sensor of this control unit or a parameter based on at least both the measured temperature and the measured humidity values of this control unit is above or below a desired value based on temperature and humidity values as measured by the other control units of the grid. The desired value based on temperature and humidity values may be a parameter or property based on at least both the measured temperature and the measured humidity values of this control unit. Such a property may for example be the absolute humidity expressed for example in g water per kg air.

The grid of control units is preferably expressed in relation to the floor area of the greenhouse. The floor area is the area vertically below the roof. Preferably a control unit is present per 2 to 200 m$^2$ of floor area, more preferably per 5 to 150 m$^2$ of floor area and even more preferably per 12 to 100 m$^2$ of floor area.

The control units may be present in the greenhouse in many different ways. In one embodiment the roof of the greenhouse is a saddle roof or arched roof which is supported by trusses and wherein the trusses are supported by columns and wherein one or more removable screens are present between the trusses. For such a greenhouse the control units may be connected to the trusses. The control units will then have to be provided with an air inlet which fluidly connected with the upper space above according to this invention as present above the screen and an air outlet fluidly connected to the lower space according to this invention as present below the screen. Preferably the ventilator and its preferred housing are present below the removable screens and an air flow path, a conduit, is present for moving air from the air inlet to the ventilator. In a preferred embodiment this flow path or conduit is flattened in order to allow the removable screen to run along the trusses in a substantially enclosed fashion. The ventilator may be suspended from the trusses or connected to the supporting columns. This allows one to add control units to an existing greenhouse.

In another preferred embodiment the roof is a saddle roof or arched roof, wherein the roof is supported by trusses and wherein the trusses are supported by columns having an inner space and wherein the one or more removable screens are present between the trusses and wherein the flow path of a control unit runs via the hollow inner space of the columns. Preferably the in air displacement controllable ventilator is connected to the column in the lower space of the greenhouse. This is advantageous because in this way the columns which supports the roof, via the trusses, have a double function. Namely to support the roof and as a flow path for air to be displaced from the upper space to the lower space. Such hollow columns are for example described in applicant's NL1043187B1.

When a removable screen is present the air inlet of the air flow path is above the removable screen. Because the columns transverse the removable screens in a typical greenhouse provided with removable screens no additional passages for the air flow path are required.

Preferably a second flow path runs via the hollow inner space of the column from an opening in the column at a lower position below the ventilator to the ventilator. This allows one to also flow air from a lower region of the lower space to a higher region of the lower space. Suitably a controllable valve is present to direct air from the upper space to the ventilator via the first flow path and/or direct air from the lower position to the ventilator. By controlling the valve position the ratio of air flowing from the upper space to the ventilator and the air flowing from a lower region of the lower space to the ventilator may be varied.

The temperature sensor and/or the humidity sensor are suitably arranged such that a temperature and/or humidity value of the air in the lower space is measured and more preferably the temperature and/or humidity value of the air in the lower space in the vicinity of the control unit. For this reason the control unit comprising the sensors are preferably present in the lower space of the greenhouse. The control unit preferably is provided with an air outlet for the displaced air at or near the control unit itself. In order to correctly and continuously measure the properties of the air it is preferred that continuously a flow of air from the vicinity of the control unit flows past the sensor or sensors. Suitably the temperature sensor and/or the humidity sensor is present in an additional flow path for air from the lower space of the greenhouse. More preferably the flow of air in such an additional flow path is created by the ventilator of the control unit itself. By arranging the additional flow path such that a venturi effect is created by the main air flow and that air from the lower space is sucked into the additional air flow path. More preferably the ventilator comprises a housing having opposite first and second ends and an axial rotor arranged in a ventilator flow path, wherein the ventilator flow path has an inlet at the first end of the housing fluidly connected to the hollow inner space of the column and an outlet at the second end of the housing fluidly connected to the lower space of the greenhouse. The additional flow path fluidly connects a further opening in the housing with the ventilator flow path such that due to a venturi effect air from the lower space flows through the additional flow path towards the ventilator flow path thereby flowing past the temperature and/or humidity sensors. In this way the temperature and/or humidity of the air in the vicinity of the ventilator can be measured. In order to be able to continuously and optimally measure a minimum air flow in the air flow path is required to create the venturi effect. This means that the ventilator of the control units suitable are operating at least at minimum capacity.

Suitably an additional temperature and/or humidity sensor is present in the first flow path suited to provide a measured temperature value and/or a measured humidity value for air in the first flow path. The central controller is programmed to individually adapt the air displacement of the ventilator of each control unit further based on the measured temperature value and/or the measured humidity value for air in the first flow. The measured values provide information on the temperature and/or humidity values of the air as displaced locally from the upper space to the lower space. This information is used to adapt the required local air displacement by the control unit and it is found that the local conditions can be brought to the same value in a quicker way. Without such an additional measurement in the first flow path the invention also works but it may take longer to reach the desired local temperature and/or humidity conditions or desired parameter or property based on at least both the measured temperature and the measured humidity values of this control unit.

The central controller may be positioned at the greenhouse. Alternatively the central controller may be positioned at a remote position and wherein the control units are connected to such a remote central controller via fixed or wireless communication means.

The measured temperature and/or humidity values of a single control unit is suitably continuously or intermittently communicated by a wireless communication to an external device. Such communication may be any wireless communication and suitably a low energy communication means. Preferably the low energy communication means is a so-called wireless personal area network (PAN) system such as for example INSTEON, IrDA, Wireless USB, Bluetooth, WIFI, Z-Wave, ZigBee or a Low Power Wide Area Network (LPWAN). This is advantageous because it avoids to install communication lines between the grid of control units and the central controller or between the control units and a gateway. The gateway can be configured to transmit data and instructions between the control units and a remote central controller. The gateway can communicate to the remote central controller via a cable network, wireless communication, such as WIFI, broadband internet access or any other computer networking technology.

Preferably the measured temperature and/or humidity values or parameters and other properties as generated by the central controller and the local air displacement volumes, for example expressed as percentage of ventilator capacity, may be presented on the tablet, laptop or mobile phone as a virtualised output of the software running on the central controller.

A remote central controller may be at a position where more than one central controllers are located which control the climate of different greenhouses. Data involving the measured values, the resulting control actions and the response of the climate in the greenhouse as collected by these more than one central controllers may be combined and used as input for an artificial intelligence (AI) software programmed to further optimise the climate control of a single greenhouse.

The invention is also directed to the following method as described below and introduced above. Method to control the climate in a greenhouse interior space comprising a an upper space positioned above a lower space by
  (i) measuring the local temperature and/or local humidity at numerous different local positions in the lower space resulting in numerous local measured temperature and/or humidity values,
  (ii) displacing air from the upper space to the lower space wherein the volume of air which is displaced at one local position is based on the measured temperature value and/or a measured humidity value at said local position.

The volume of air which is displaced at one local position may be based on the measured temperature value and/or a measured humidity value at said local position and based on the measured temperature value and/or a measured humidity value of the remaining local positions. The method is suitably used when the lower space suitably comprises air having a temperature which is on average higher than the average temperature of the air comprised in the upper space. When the desired conditions are achieved it is preferred that air will remain to be circulated.

In step (i) the temperature and humidity is measured resulting in numerous local measured temperature and humidity values and wherein in (ii) the volume of air which is displaced at one local position is based on when the measured temperature value and/or measured humidity value at said local position is above or below a desired value based on temperature and humidity values as measured by the other control units of the grid. This desired value may be the calculated value described above.

The volume of air which is displaced at one local position may be increased when the measured temperature value at said local position is higher than a calculated value based on the temperature values as measured by the other control units of the grid.

Steps (i) and (ii) may be performed at numerous local positions simultaneously in the greenhouse interior space. Preferably per 2 to 200 m2, more preferably per 5 to 150 m2 and even more preferably per 12 to 100 m2 of floor area a local position is present. Floor area is here the projected floor area by the greenhouse interior space has a projected floor area and wherein The method is preferably performed in a greenhouse according to the invention.

BRIEF DESCRIPTION OF THE DRAWINGS

The invention shall be illustrated by the following FIGS. 1-12.

FIG. 6 shows the floor plan of a greenhouse used in Example 1.

FIG. 7 shows a cross section of the greenhouse used in Example 1.

FIG. 8 shows the settings of the ventilators of the greenhouse used in

Example 1.

Figure 9:
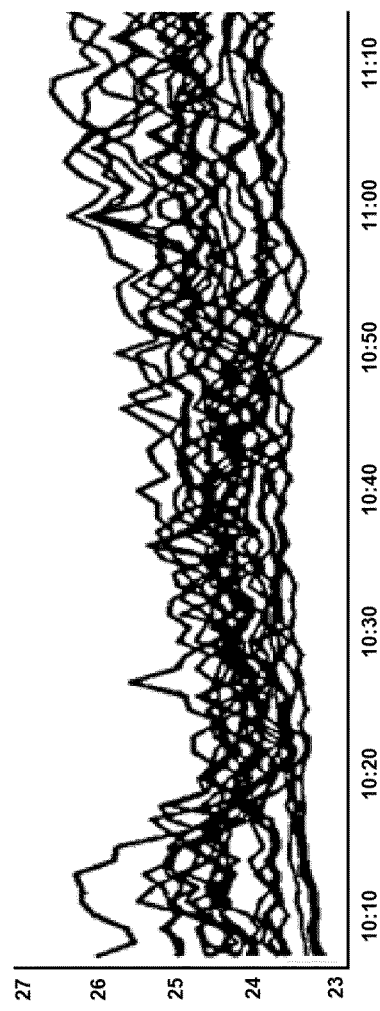

FIG. 9 shows the temperature variation in the greenhouse of Example 1 in time in the lower space.

Figure 10:
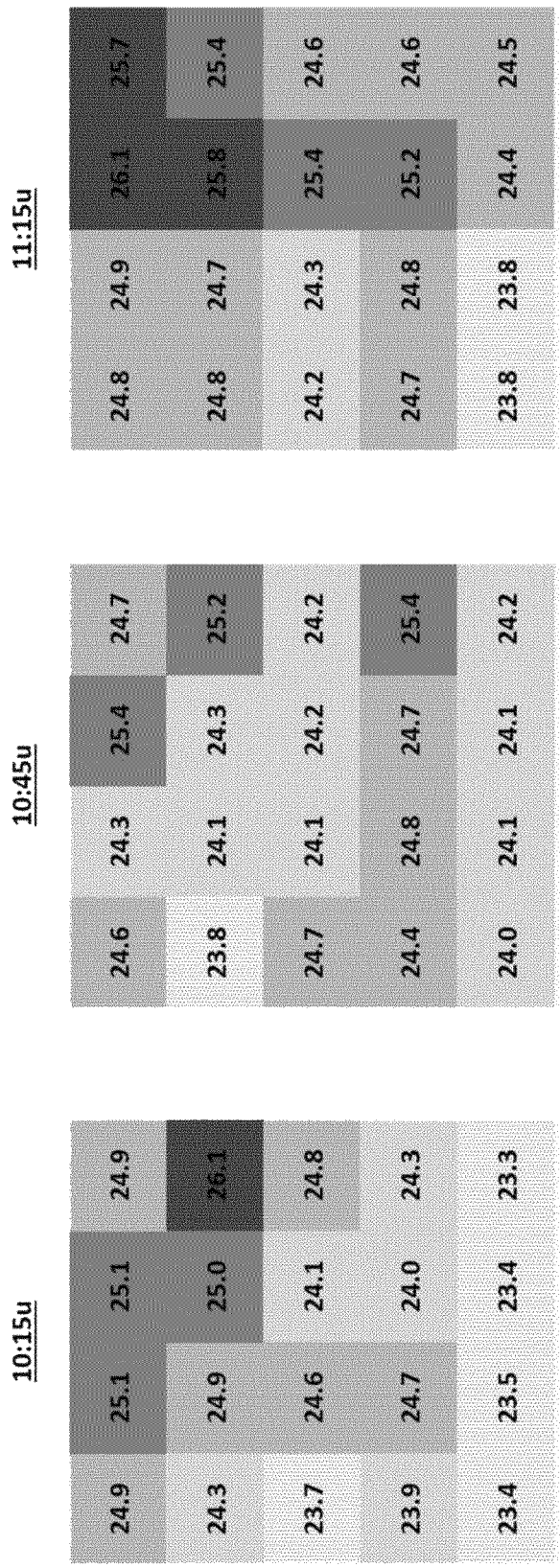

FIG. 10 shows the heat maps of the greenhouse of Example 1 at three different moments in time.

Figure 11:
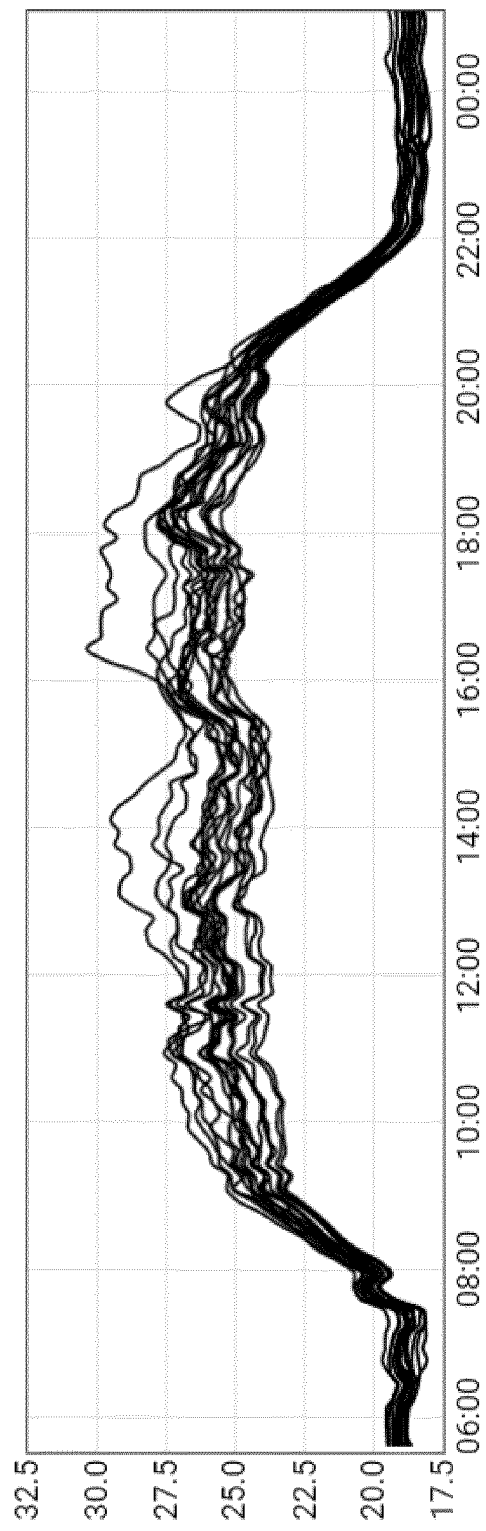

FIG. 11 shows the measured temperatures during a 24 hour period by the different units of Example 2.

Figure 12:
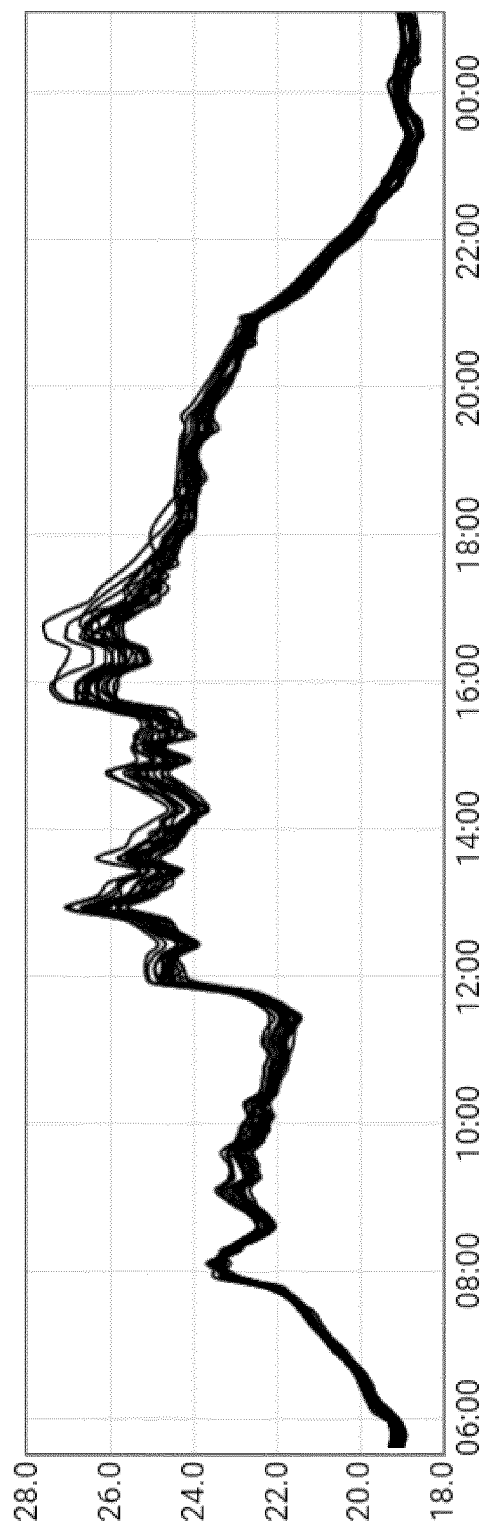

FIG. 12 shows the measured temperatures during a 24 hour period by the different units of Example 3.

DETAILED DESCRIPTION OF EXAMPLE EMBODIMENTS

The invention shall be illustrated by the following non-limiting examples.

EXAMPLE 1

Figure 1:
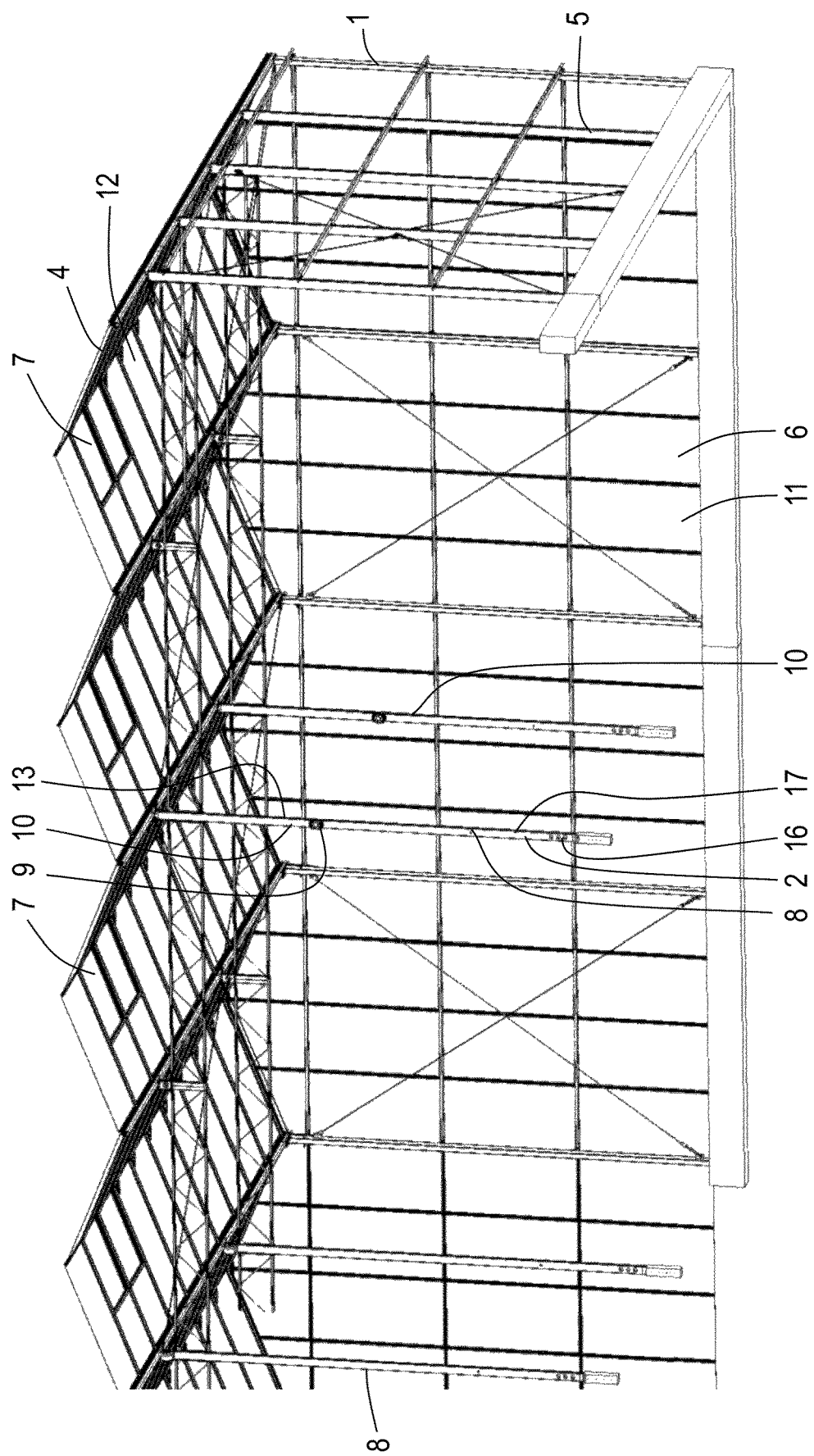
FIG. 1 shows a 3-dimensional view of part of a greenhouse (1) according to the invention provided with a climate control system (2) and a saddle roof (4), walls (5) and a floor (not shown) defining an interior greenhouse space (6). The interior greenhouse space (6) comprising an upper space (12) and a lower space (11) as present below the upper space (12). The roof (4) is provided with closable windows (7). This figure shows four hollow columns (8) of which two are provided with a in air displacement controllable ventilator (9) for displacement of air from the upper space (12) to the lower space (11) via the air flow path (13) which runs via the hollow column (8). The ventilators (9) are part of a grid of control units (10) as part of the climate control system (2). The climate control system (2) is further comprised of a central controller (34) (see FIG. 6). Further trusses (15) are shown. Hollow columns (8) are further provided with openings (16) at their lower end and a second flow path (17) runs via the hollow inner space of the column (8) from this opening (16) at a lower position below the ventilator (9) to the ventilator (9).
Figure 3:
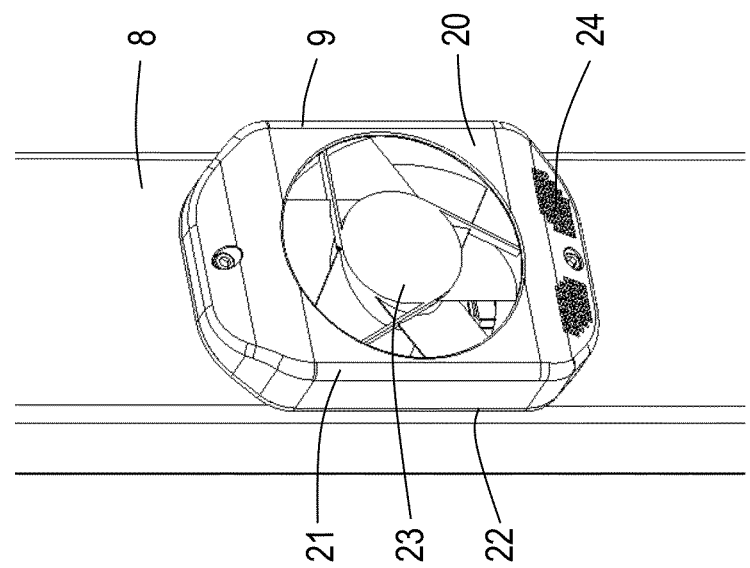
FIG. 3 shows a detail of FIG. 2. A ventilator (9) is shown attached to a hollow column (8) having a hollow inner space (8a). The ventilator (9) has a housing (20) having opposite first (21) and second ends (22) and an axial rotor (23) arranged in a ventilator flow path (23a) between an inlet (21a) and an outlet (22a). The outlet (22a) is fluidly connected to the inner space (1a) of greenhouse (1). An opening (24) in the housing (20) is a gas inlet opening (24) of the additional flow path (25) further shown in FIGS. 4 and 5.
Figure 2:
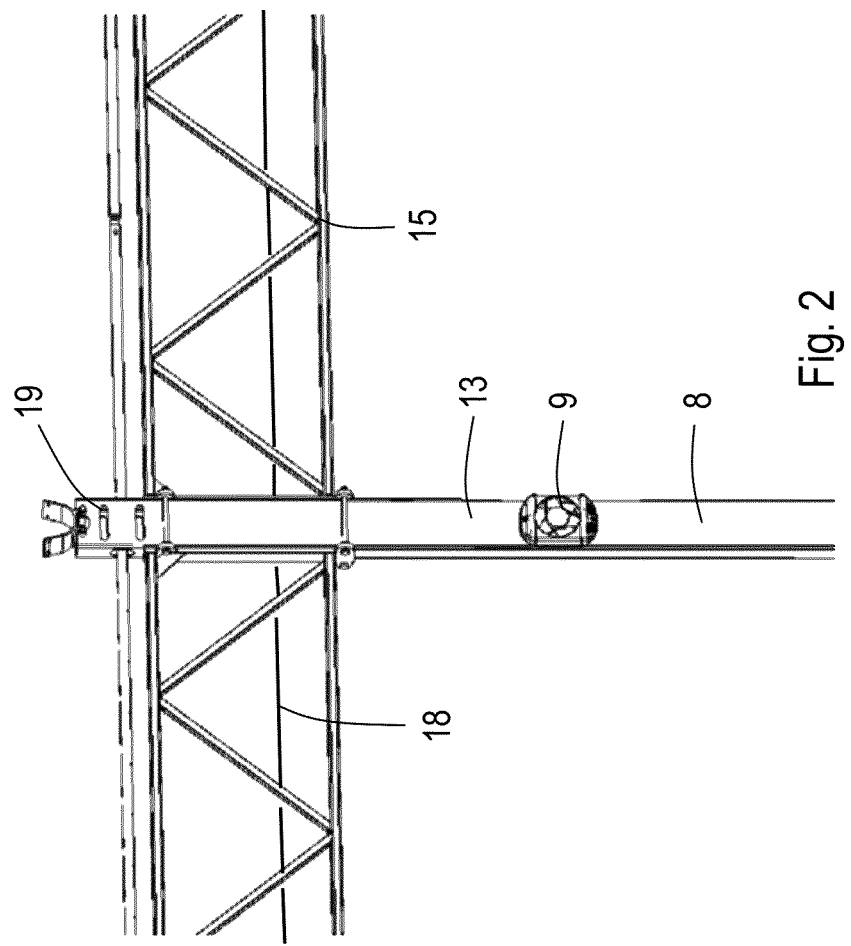
FIG. 2 shows a detail of FIG. 1 showing a hollow column (8) provided with a ventilator (9) and the air flow path (13). The column supports trusses (15). Between trusses (15) a substantial horizontal removable screen (18) is present. At the top end of the column (8) openings (19) are shown for intake of air from the upper space (12).
Figure 4:
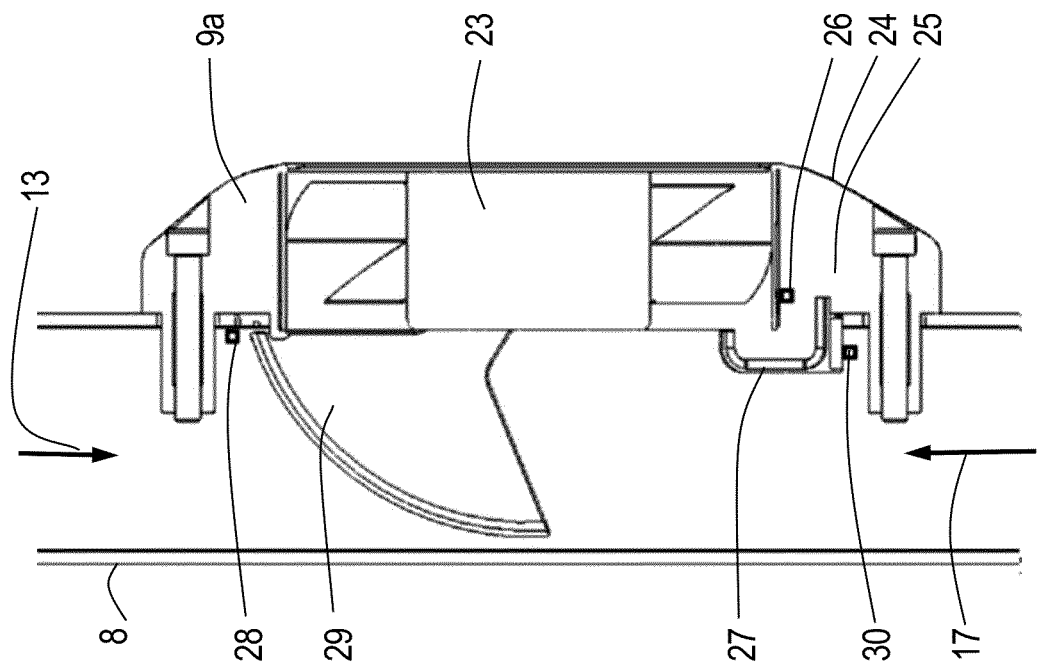
FIG. 4 shows a cross-sectional view of the ventilator and column shown in FIG. 3. In this Figure the additional flow path (25) and temperature sensor (26) is shown. This temperature sensor measures the temperature of the air drawn in via opening (24) and flowing through additional flow path (25). In this way the temperature is measured of the air in the lower space in the vicinity of the ventilator (9). In order to continuously measure this temperature it is required that the axial rotor (23) displaces a minimum amount of air from the hollow column (8) to the first end (21). In this way air will be drawn in due to the venturi effect caused by the U-bend (27) in the additional flow path. Also a temperature sensor (28) is shown to measure the temperature in the air flow path (13) of the air drawn in from the upper space (12) to be discharged via ventilator (9) into the lower space (11).
Figure 5:
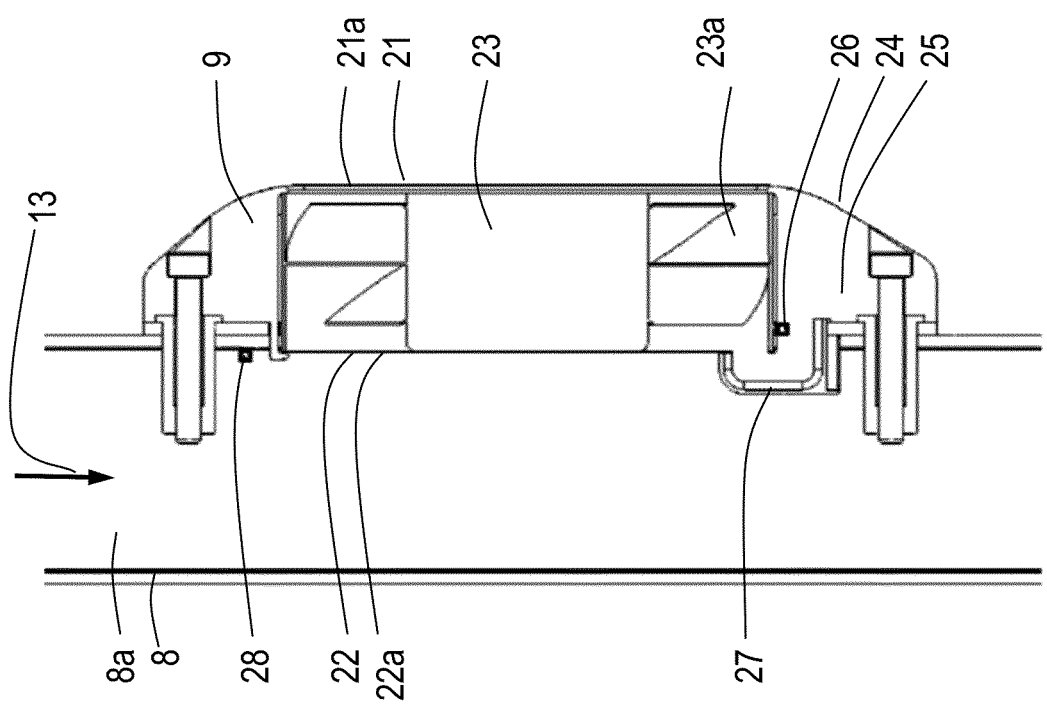
FIG. 5 shown a variant of the ventilator (9) of FIG. 4. A ventilator (9a) is shown provided with a valve (29) which can influence the amount of air drawn in from the upper space (12) via air flow (13) or via second air flow path (17) from a position below the ventilator via openings (16) as shown in FIG. 1 via the hollow column to the ventilator (9a). This valve (29) may block air flow (13) or may block second air flow path (17) or may allow both air flows to flow when the axial rotor (23) of ventilator (9) is in operation. A further temperature sensor (30) is present to measure the temperature of the second air flow path (17). Such a temperature sensor (30), which may also be a humidity sensor is present in the second flow path suited to provide a measured temperature value and/or a measured humidity value for air in the second flow path. The measured values provide information on the temperature and/or humidity values of the air as displaced locally from the a position below the ventilator. This information may be used to adapt the required local air displacement by the control unit and it is found that the local conditions can be brought to the same value in a quicker way. Without such an additional measurement in the second flow path the invention also works but it may take longer to reach the desired local temperature and/or humidity conditions or desired parameter or property based on at least both the measured temperature and the measured humidity values of this control unit.

A greenhouse of FIG. 1 having a total area of 600 $m^2$ was provided with 20 control units (10) resulting in one unit (10) every 30 $m^2$ of greenhouse floor (3) area This layout is schematically shown in FIGS. 6 and 7. FIG. 6 shown the floor plan having two rows (30,31) of 5 columns (8). Every column (8) is provided with a pair of ventilators (9) of FIG. 4 which discharge air from the upper space (12) into opposite directions as indicated by arrows (32) in FIGS. 6 and 7. The control unit (10) was provided with a temperature sensor (28) to measure the temperature at an elevation of 4 m above the floor area (3). The greenhouse had closed screens (18) at an elevation of 5.5 m dividing the greenhouse in a lower space (11) and an upper space (12). In the lower space a cultivation (33) of various crops was present. The upper space was further defined by a saddle roof (4) with open windows (7) at the south-west and north-east side.

Figure 8:
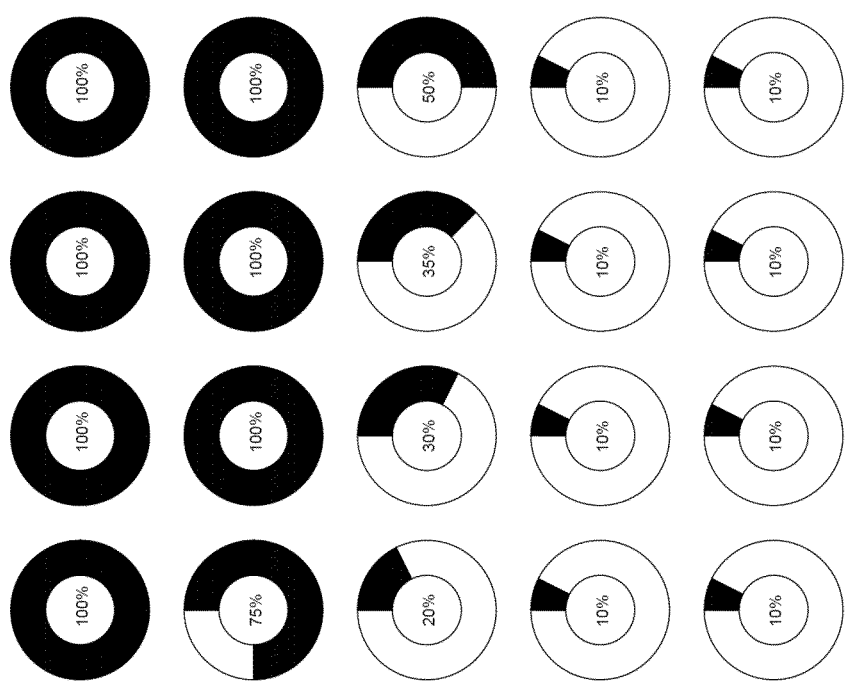

In this first experiment the air displacement of the ventilator (9) is manually increased according to the settings shown in FIG. 8. The temperatures were measured during a 1 hour period by the different units and FIGS. 9 and 10 presents the results. FIG. 9 shows the temperature variation in the greenhouse between 10 o'clock and 11.15 o'clock in the morning wherein each line represents the measured temperature in the lower space by one control unit. FIG. 10 illustrates heat maps of the greenhouse of this example at 10:15 at 10:45 and at 11:15. In this heat map the local temperatures are shown for the 20 control units shown in FIG. 6.

EXAMPLE 2

In a second experiment the ventilators of all the units operated at the same air displacement from upper space to lower space. The temperatures were measured during a 24 hour period by the different units and the results are presented in FIG. 11. Each line represents the temperature measured by a single control unit.

EXAMPLE 3

In a third experiment a controller (34) was used which controller (34) was programmed to individually increase the air displacement of the ventilator (9) of a control unit (10) when the temperature as measured by the temperature sensor (26) of the local control unit (10) is above a set temperature. Wherein the set temperature is the lowest value of all measured temperature values measured by all control units. The temperatures were measured during a 24 hour period by the different units and the results are presented in FIG. 12. Each line represents the temperature measured by a single control unit.

When comparing FIG. 11 with FIG. 12 it is clear that when the controller (34) was used the individual lines are closer together than when no controller is used. When the lines are closer together a more homogenic temperature in the lower space (11) is indicated which is advantageous for the growth of the different crop cultivations.

The invention claimed is:

1. A greenhouse comprising a climate control system and a roof, walls and a floor defining an interior greenhouse space, said greenhouse space comprising an upper space and a lower space below the upper space:
   wherein the roof is provided with closable openings;
   wherein the climate control system comprises a grid of control units and a central controller;
   wherein a control unit comprises an air flow path from the upper space to the lower space, an in air displacement controllable ventilator for displacement of air from the upper space to the lower space via the air flow path and present in the lower space of the greenhouse and wherein the temperature sensor and/or a humidity sensor are suited to provide a measured temperature value and/or a measured humidity value;
   wherein the central controller is programmed to individually adapt the air displacement of the ventilator of each control unit based on the measured temperature values and/or a measured humidity values;
   wherein the ventilator comprises a housing having opposite first and second ends and an axial rotor arranged in a ventilator flow path, wherein the ventilator flow path has an inlet at the first end of the housing and an outlet at the second end of the housing and wherein an additional flow path is present comprising one or more temperature and/or humidity sensors and which additional flow path fluidly connects an opening in the housing with the ventilator flow path for drawing in air due to a venturi effect via the additional flow path towards the ventilator flow path; and
   wherein the roof is a saddle roof or arched roof wherein the roof is supported by trusses and wherein the trusses are supported by hollow columns having a hollow internal space and wherein one or more removable screens are present between the trusses, whereby the removable screens divide the interior greenhouse space into the upper and the lower space.

2. A greenhouse according to claim 1, wherein the central controller is programmed to individually adapt the air displacement of the ventilator of a single control unit using the temperature value and/or humidity value as measured by the control unit and the one or more temperature values and/or one or more humidity values as measured by one or more other control units of the grid.

3. A greenhouse according to claim 2, wherein the central controller is programmed to individually increase the air displacement of the ventilator of a single control unit when the temperature value as measured by the control unit is higher than a calculated value based on the temperature values as measured by the other control units of the grid.

4. A greenhouse according to claim 2, wherein the central controller is programmed to individually increase the air displacement of the ventilator of a single control unit when the humidity value as measured by the control unit is higher than a calculated value based on the humidity values as measured by the other control units of the grid.

5. A greenhouse according to claim 1, wherein a control unit comprises a temperature sensor and a humidity sensor and wherein the central controller is programmed to individually adapt the air displacement of the ventilator of a single control unit when the measured temperature value and/or measured humidity value as measured by the temperature and humidity sensor of this control unit or a parameter based on at least both the measured temperature and the measured humidity values of this control unit is above or below a desired value based on temperature and humidity values as measured by the other control units of the grid.

6. A greenhouse according to claim 1, wherein the floor has a floor area and wherein per 2 to 200 square meters ($m^2$) of floor area a control unit is present.

7. A greenhouse according to claim 6, wherein per 5 to 150 square meters ($m^2$) of floor area a control unit is present.

8. A greenhouse according to claim 7, wherein per 12 to 100 square meters ($m^2$) of floor area a control unit is present.

9. A greenhouse according to claim 1, wherein the air flow path from the upper space to the lower space runs via the hollow inner space of the columns.

10. A greenhouse according to claim 9, wherein the inlet at the first end of the in air displacement controllable ventilator is connected to the hollow inner space of the column in the lower space of the greenhouse.

11. A greenhouse according to claim 10, wherein a second flow path runs via the hollow inner space of the column from an opening in the column at a lower position below the ventilator to the ventilator and wherein a valve is present to direct air from the upper space of the greenhouse to the ventilator via the first flow path and/or direct air from the lower position to the ventilator.

* * * * *